United States Patent [19]

Nakano et al.

[11] Patent Number: 5,264,941
[45] Date of Patent: Nov. 23, 1993

[54] LARGE SCREEN DISPLAY APPARATUS UTILIZING A TRANSPARENT PLATE TO DISPLAY AN IMAGE OVER AN ENTIRE SURFACE OF A DIFFUSING SURFACE

[75] Inventors: Masaaki Nakano; Naoki Shiramatsu; Shuji Iwata; Hajime Nakajima, all of Amagasaki, Japan

[73] Assignee: Mitsubishi Denki Kabushiki Kaisha, Tokyo, Japan

[21] Appl. No.: 1,230

[22] Filed: Jan. 6, 1993

Related U.S. Application Data

[63] Continuation of Ser. No. 739,244, Aug. 1, 1991, abandoned.

[30] Foreign Application Priority Data

Aug. 3, 1990 [JP] Japan .................... 2-207289

[51] Int. Cl.⁵ .................................................. H04N 5/74
[52] U.S. Cl. ........................................ 358/231; 358/237; 358/60; 358/238; 359/460; 359/457
[58] Field of Search ............... 358/56, 60, 64, 231, 358/237, 238, 239, 240, 241, 230, 242; 359/451, 455, 453, 456, 457, 460, 599, 68, 69, 707

[56] References Cited

U.S. PATENT DOCUMENTS

| | | | |
|---|---|---|---|
| 4,364,635 | 12/1982 | Stief | 359/460 |
| 4,804,884 | 2/1989 | Vriens | 358/237 |
| 4,866,530 | 9/1989 | Kalua | 358/237 |
| 4,875,064 | 10/1989 | Umeda | 358/231 |
| 4,901,155 | 2/1990 | Hara | 358/60 |
| 5,011,277 | 4/1991 | Ogino | 358/237 |

FOREIGN PATENT DOCUMENTS

| | | |
|---|---|---|
| 0203646 | 5/1986 | European Pat. Off. . |
| 0331847 | 12/1988 | European Pat. Off. . |
| 2-134677 | 5/1990 | Japan . |
| 2-36877 | 9/1990 | Japan . |
| 3-85879 | 4/1991 | Japan . |
| 2236447 | 4/1991 | United Kingdom . |

OTHER PUBLICATIONS

Proceedings of the 1989 (The Institute of Television Engineers of Japan) annual convention.

Primary Examiner—James J. Groody
Assistant Examiner—Sherrie Hsia

[57] ABSTRACT

A large-size screen display apparatus, having a plurality of projection display devices arrayed in a matrix arrangement to form one large screen, is for displaying characters and the like. A screen of each projection display device consists of a transparent plate disposed on the light entrance side and a diffusing surface disposed on the viewing side. Further, and the periphery of the transparent plate is mounted to a housing of the display apparatus. Light rays emanated from a projection lens are reflected by the transparent plate, whereby an optical image is formed on the entire diffusing screen. Since the optical image is displayed on the entire surface of the diffusing screen, no non-display areas will appear on the screen even when the plurality of projection display device are arranged in the matrix array.

4 Claims, 7 Drawing Sheets

LARGE SCREEN DISPLAY APPARATUS UTILIZING A TRANSPARENT PLATE TO DISPLAY AN IMAGE OVER AN ENTIRE SURFACE OF A DIFFUSING SURFACE

This application is a continuation of application Ser. No. 07/739,244 filed on Aug. 1, 1991, now abandoned.

BACKGROUND OF THE INVENTION

1. Field of the Invention

This invention relates to a projection type large-size screen display apparatus.

2. Description of the Related Art

Hitherto, there has been developed a large-size screen display apparatus for displaying a single image on a screen having a size of 40 inches or thereabouts by merging optical images formed on respective monochromatic cathode-ray-tubes in red, blue, and green with the size of 7 inches. This conventional large-size screen display apparatus has several disadvantages such as a drop in brightness due to the increase in the projection magnification factor necessary for effecting display on a large-size screen, and the increase in volume of a cabinet for securing a long projection distance.

As a large-size screen display apparatus which is capable of effecting display on a large-size screen while the size of the apparatus and the brightness of the picture are maintained, there is known a large-size screen display comprising a plurality of projection display devices having the size of 40 inches or thereabouts arranged in a matrix layout.

FIG. 7 of the accompanying drawings is a schematic representation of a conventional multi-display apparatus having a plurality of projection display apparatuses arranged in a matrix. In FIG. 7, the reference numeral 500 designates a rear-projection type projection display device. This projection display device has a display screen consisting of a column line including four of the projection display devices 500 and a row line including four of the projection display devices 500, and each projection display device 500 displays an enlarged subdivision of one picture frame by the use of a video signal quadrupled both longitudinally and laterally.

FIG. 8 is a cross sectional view of the projection display device 500 of FIG. 7. In FIG. 8, the reference numeral 501 designates a cathode-ray-tube (hereinafter referred to as CRT); 502, a projection lens; 503, a projection screen; 504, a screen frame; 505, a housing for accommodating and supporting the CRT 501 and the projection lens 502.

An enlarged subdivisional image formed on the CRT 501 is projected onto the projection screen 503 through the projection lens 502. The projection screen 503 is attached to the housing 505 with the periphery thereof fixed in a groove of the housing. One large-size screen is made up of a plurality of projection screens 503 arranged planarly in a matrix layout, each being mounted to the corresponding screen frame 504. This thereby produces the large-size screen display apparatus shown in FIG. 7.

The conventional large-size screen display apparatus having the above structure causes non-display areas having a stripe shape to appear longitudinally and laterally on the projection screen due to the presence of the screen frame for securing the projection screen in the optical path when the plural projection display apparatuses are arrayed in combination, which impairs the picture quality.

SUMMARY OF THE INVENTION

This invention is aimed at overcoming the drawbacks in the conventional large-size screen display apparatus, and an object of the invention is to provide a high quality large-size screen display apparatus by suppressing the occurrence of the non-display areas which impair the picture quality.

To this aim, according to one aspect of this invention, in a large-size screen display apparatus embodying this invention, a screen of a projection display device includes a transparent plate and a diffusing surface. This transparent plate is formed on the light entrance side of the screen on which light rays emanated from the projection lens are incident, and the periphery of the transparent plate is mounted to the housing of the projection display device. The transparent plate is fabricated either in the form of a concave lens and a Fresnel lens, or else in the form of a distributed-refraction plate. A feature of the apparatus is that the optical refractive index increases progressively from the center to the corners, whereby optical images are produced on the entire diffusing screen by the reflection of the light rays incident on the transparent plate.

Accordingly, it is possible to prevent the impairment in the picture quality by preventing the occurrence of any non-display areas due to the matrix arrangement of plural projection type display devices.

BRIEF DESCRIPTION OF THE ACCOMPANYING DRAWINGS

The novel features and characteristics of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE EMBODIMENTS

Upon reference to the accompanying drawings, a projection display apparatus according to this invention will be described hereunder.

Figure 1:
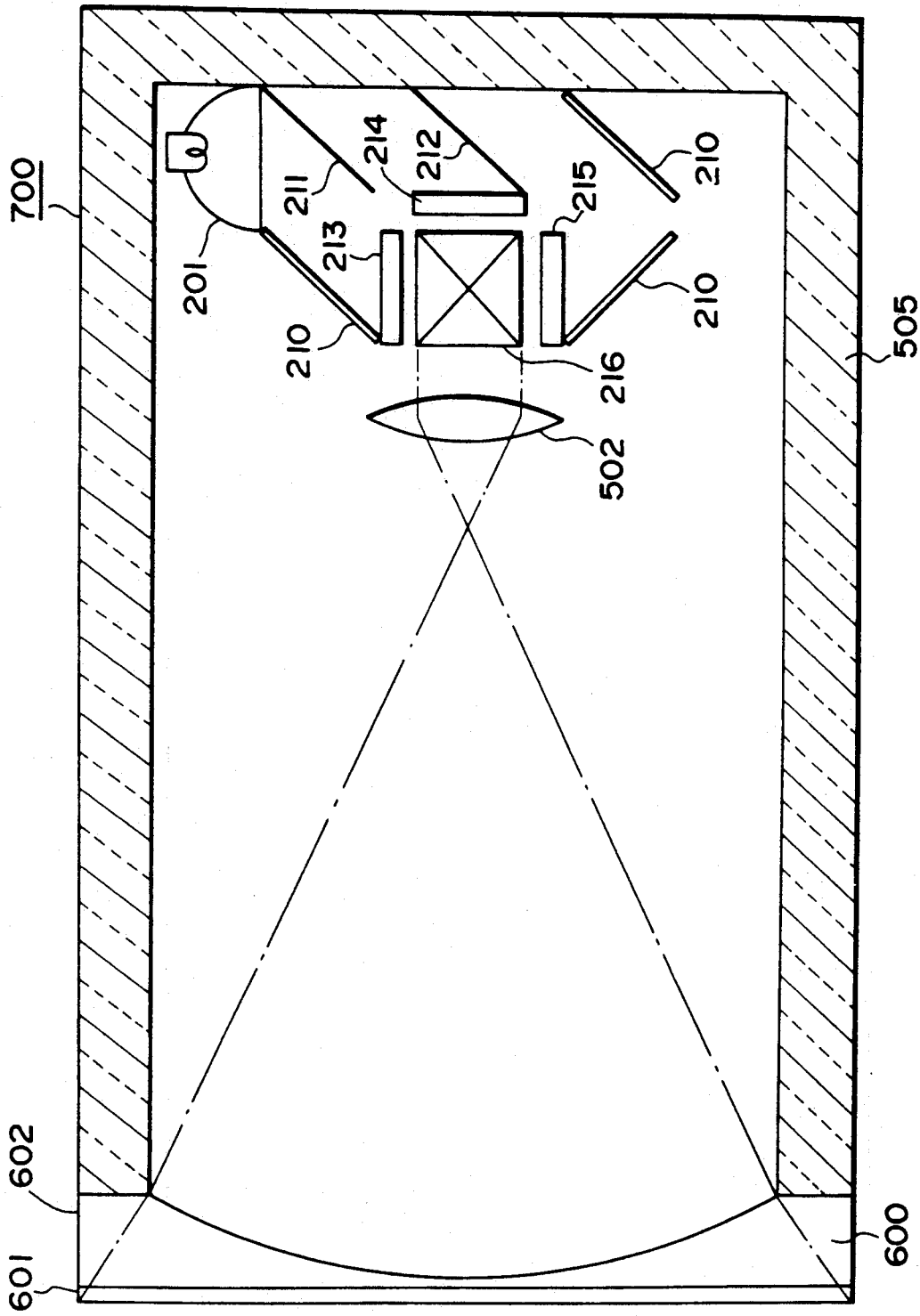
FIG. 1 is a cross sectional plan view showing the structure of a projection display device according to a first embodiment of the invention.

FIG. 1 is a cross sectional plan view showing the structure of a projection display device exemplifying this invention, and the apparatus employs a three-plate liquid crystal light bulb.

In FIG. 1, the reference numeral 201 designates a halogen lamp light source; and 210, a mirror. 211 designates a blue reflecting dichroic mirror; and 212, a green reflecting dichroic mirror. The reference numeral 213 designates a blue light bulb; 214, a green light bulb; and 215, a red light bulb, each light bulb consisting of a liquid crystal cell sandwiched between two crossed polarizing plates to form an optical image in respective corresponding color. The reference numeral 216 designates a dichroic prism for composing a single multicolored image by merging three optical color images; 502, a projection lens; and 505, a housing accommodating and supporting the light source 201, mirror 210, dichroic mirrors 211, 212, light bulbs 213, 214, 215, dichroic prism 216, and projection lens 502.

The reference numeral 600 designates a projection screen composed of a diffusing surface 601 provided on the viewing side and a concave transparent plate 602 provided on the light entrance side attached together. Further, the projection screen 600 is mounted to the housing 505 with the concave lens plate 602 provided on the light entrance side. Here, the reference numeral 700 designates a projection display apparatus.

The operation of the projection display apparatus will be explained hereinbelow.

Light rays emanated from the halogen lamp 201 are split into blue, green and red by means of the blue reflecting dichroic mirror 211 and the green reflecting dichroic mirror 212. Light rays in each primary color are projected onto the screen 600 through the projection lens 502 after having been modified in light intensity by means of the blue light bulb 213, the green light bulb 214, and the red light bulb 215, respectively.

The light rays to be projected at the corners of the optical image on the respective light bulbs are incident on the joining portion or thereabouts where the concave lens plate 602 and the housing are linked together. Thereafter, the light rays are reflected towards the periphery of the screen 600 so as to form an image at the corners of the diffusing surface 601. Therefore, when the screen 600 is viewed from the direction opposite to the projecting direction, a composite optical image produced by merging images from respective light bulbs is projected onto the entire screen 600.

Figure 2:
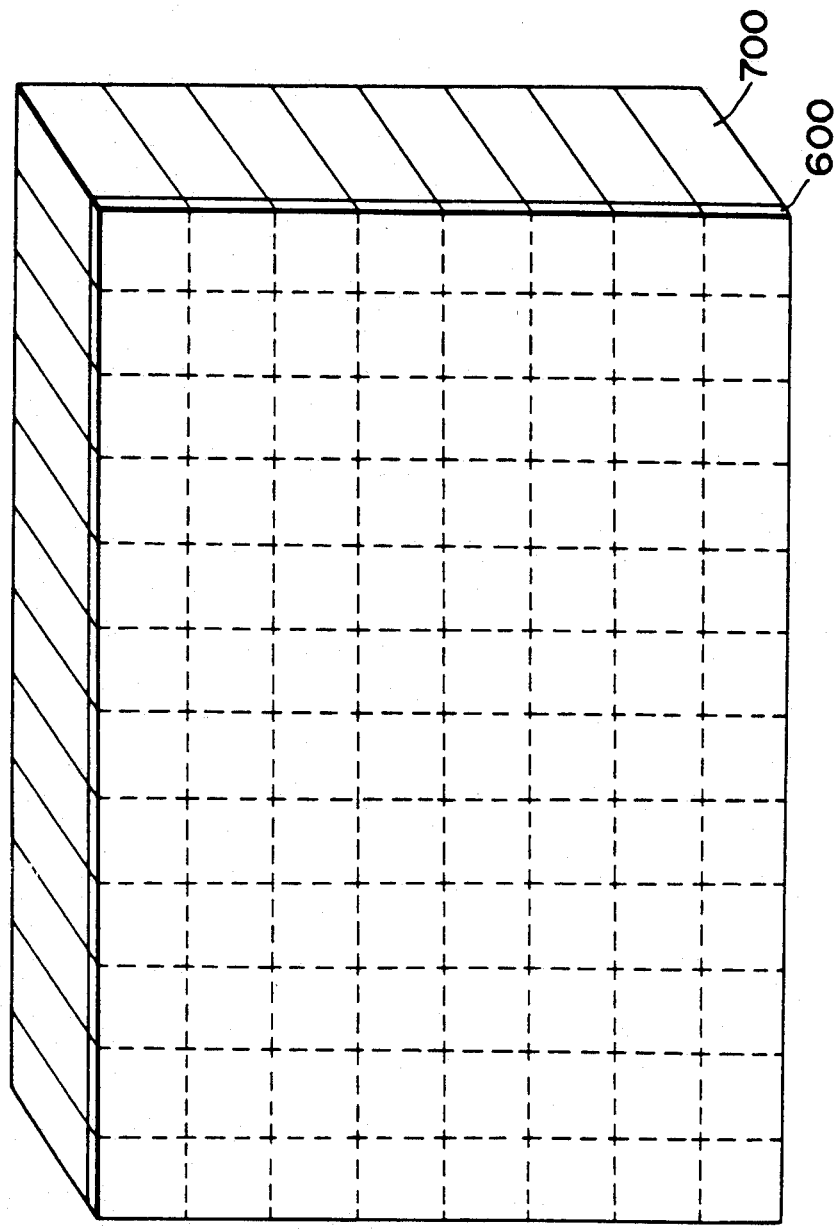
FIG. 2 is a perspective view showing the arrangement of a large-size screen display apparatus according to the first embodiment of the invention.

FIG. 2 is a perspective plan view showing the arrangement of the multi-display large screen display apparatus having a plurality of projection display devices 700 arrayed both longitudinally and laterally in a matrix layout. Images are displayed on the whole screen 600 of each of the projection display devices 700 which are arranged without a seam, thereby constructing one large-size display screen without the occurrence of non-display areas.

Assuming that each of the light bulbs 213, 214, 215 of FIG. 1 are manufactured in accordance with specifications set forth in table 1, and the projection magnification factor is selected as three times, the display characteristics of each projection display apparatus will be as described in table 2.

TABLE 1

| NUMBER OF PIXELS | 32 × 32 pixels |
|---|---|
| PIXEL PITCH | 1 mm |
| SIZE OF IMAGE FORMING AREA | 32 × 32 mm |

TABLE 2

| NUMBER OF PIXELS | 32 × 32 pixels |
|---|---|
| PIXEL PITCH | 3 mm |
| SCREEN SIZE | 96 × 96 mm |

As is evident from the above tables, it is possible to constitute a large-size screen projection display apparatus, approximately equivalent to the size of a high definition television set. The apparatus has the size of 240 inches and 960×1700 pixels by arranging the projection display devices 700 into a matrix layout composed of 30 displays in a column, and 53 displays in a row. Further, according to the first embodiment of this invention, since the projection magnification factor is selected as low as three times, a thin type large-size screen display apparatus can be produced because of the reduction in projection distance.

Given that a screen gain is selected to be, 1, since a screen brightness is in reverse proportion to the square of the projection magnification factor, the screen brightness will be one ninth of the brightness of the light bulb in the case where the projection magnification factor is selected to be 3 times. Further, and the screen brightness will be one sixteenth of the brightness of the light bulb in the case where the projection magnification factor is selected to be 4 times. In the existing apparatus, since the projection magnification factor is usually selected to be 10 times, the brightness drops to as low as one hundredth of the brightness of the light bulb. To counter this, according to this invention, it is possible to secure a high screen brightness by selecting the projection magnification factor in the range of fourfold or less.

Figure 3:
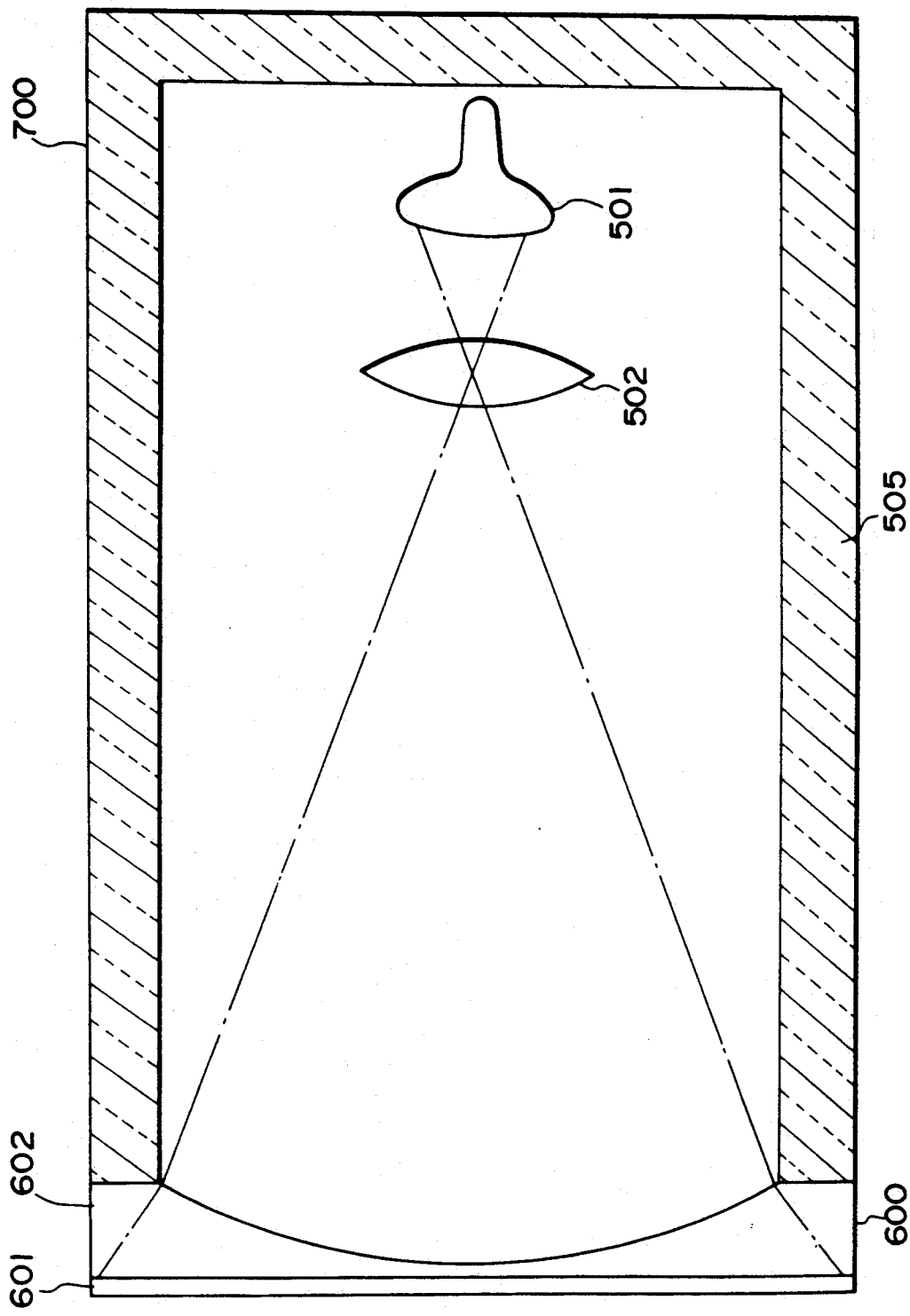
FIG. 3 is a cross sectional plan view showing the structure of a projection display device according to a second embodiment of the invention.

While the optical image forming section according to the first embodiment has been described by the employment of the three-plate liquid crystal light bulb system, it may be appreciated that the same advantage may be obtained by the use of a single-plate light bulb having a color filter provided on a single liquid crystal cell. Moreover, as shown in FIG. 3, similar results may be produced by the use of the projection CRT 501 in the optical image forming section.

Figure 4:
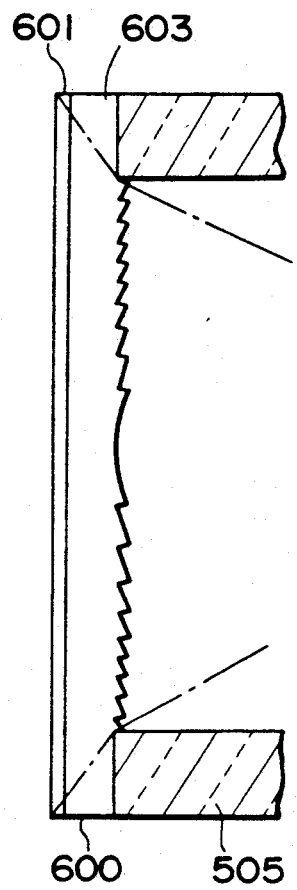
FIG. 4 is a partially enlarge cross sectional plan view showing the structure of a projection screen according to a third embodiment of the present invention.

Further, although a means for creating optical images projected from the optical image forming section on the entire screen surface has been disclosed in the form of the concave transparent plate 602, as can be seen from FIG. 4, similar results may be secured by the use of a projection screen 600 to mounted to the housing 505 and being composed of the diffusing surface 601 having the same configuration and provided on the viewing side, and a fresnel lens 603 capable of producing similar results as produced by the concave lens provided on the incident side, both being attached together.

Figure 5:
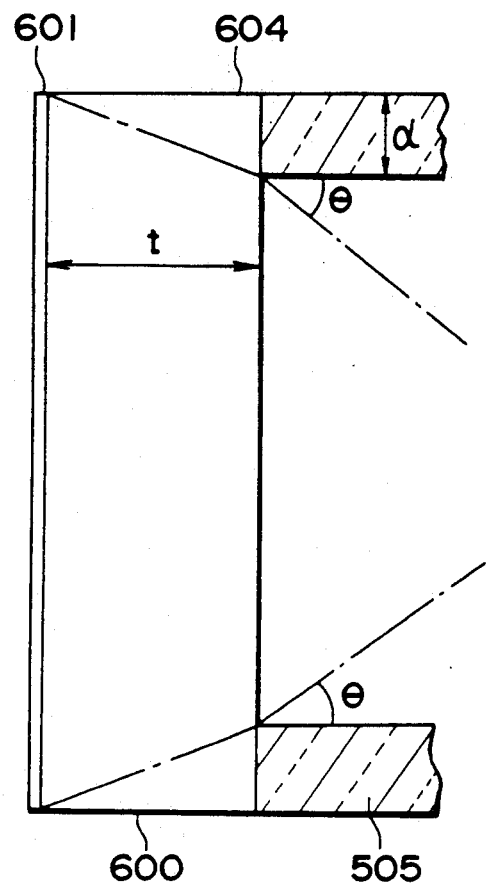
FIG. 5 is a partially enlarged cross sectional plan view showing the structure of a projection screen according to a fourth embodiment of the present invention.

Still further, as shown in FIG. 5, the projection screen 600 may be alternatively replaced by a screen consisting of the diffusing surface 601 provided on the viewing side and a transparent plate 604 provided on the light entrance side, both attached together. In this case, however, the thickness "t" of the transparent plate 604 should be given by $$t = d(n_p^2/\sin^2\theta - 1)^{\frac{1}{2}}$$

where "d" denotes the thickness of the housing 505; $\theta$, an incident angle of the principal light rays to form the corners of the optical image in the optical image forming section, i.e. light bulb, relative to the transparent plate 604; and $n_p$, the refractive index of the transparent plate 604.

Figure 6:
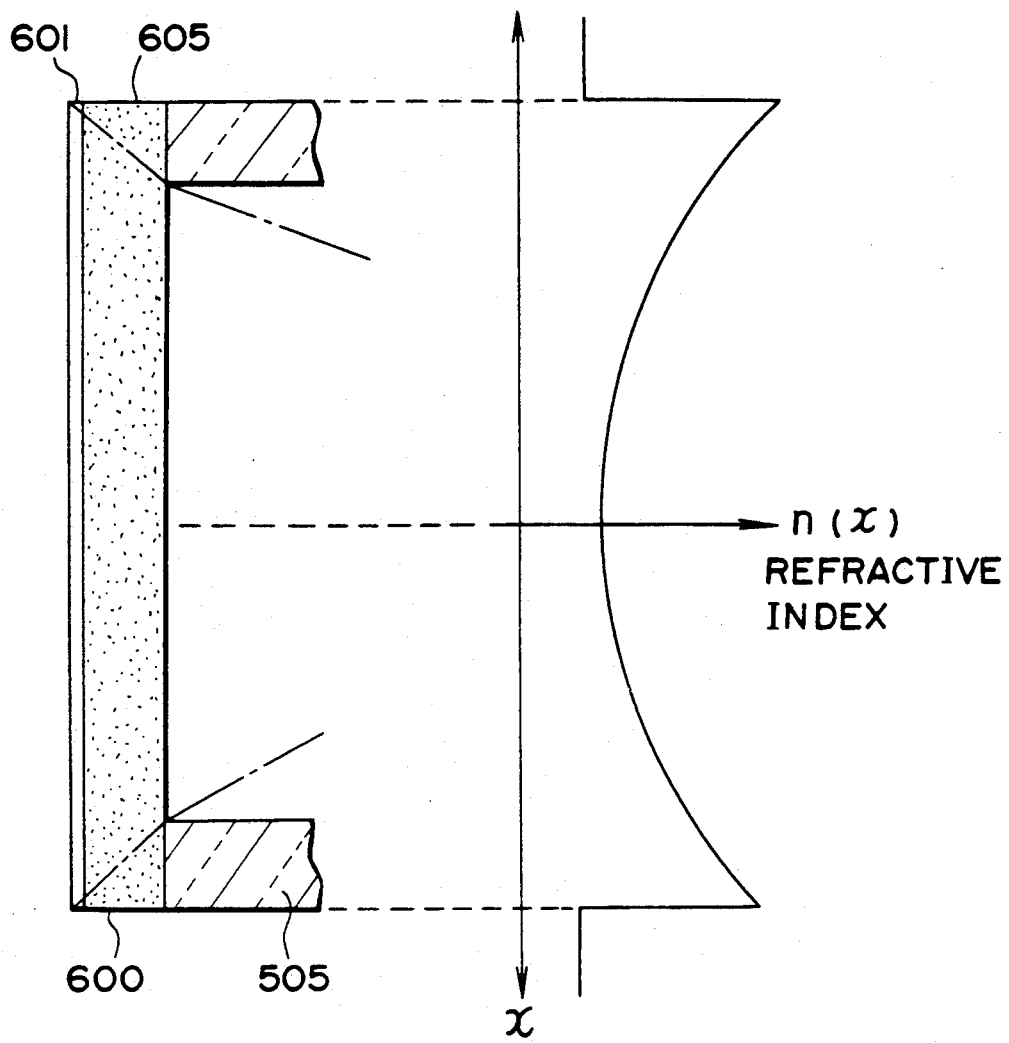
FIG. 6 is a partially enlarged cross sectional plan view showing the structure of a projection screen according to a fifth embodiment of the present invention.
Figure 7:
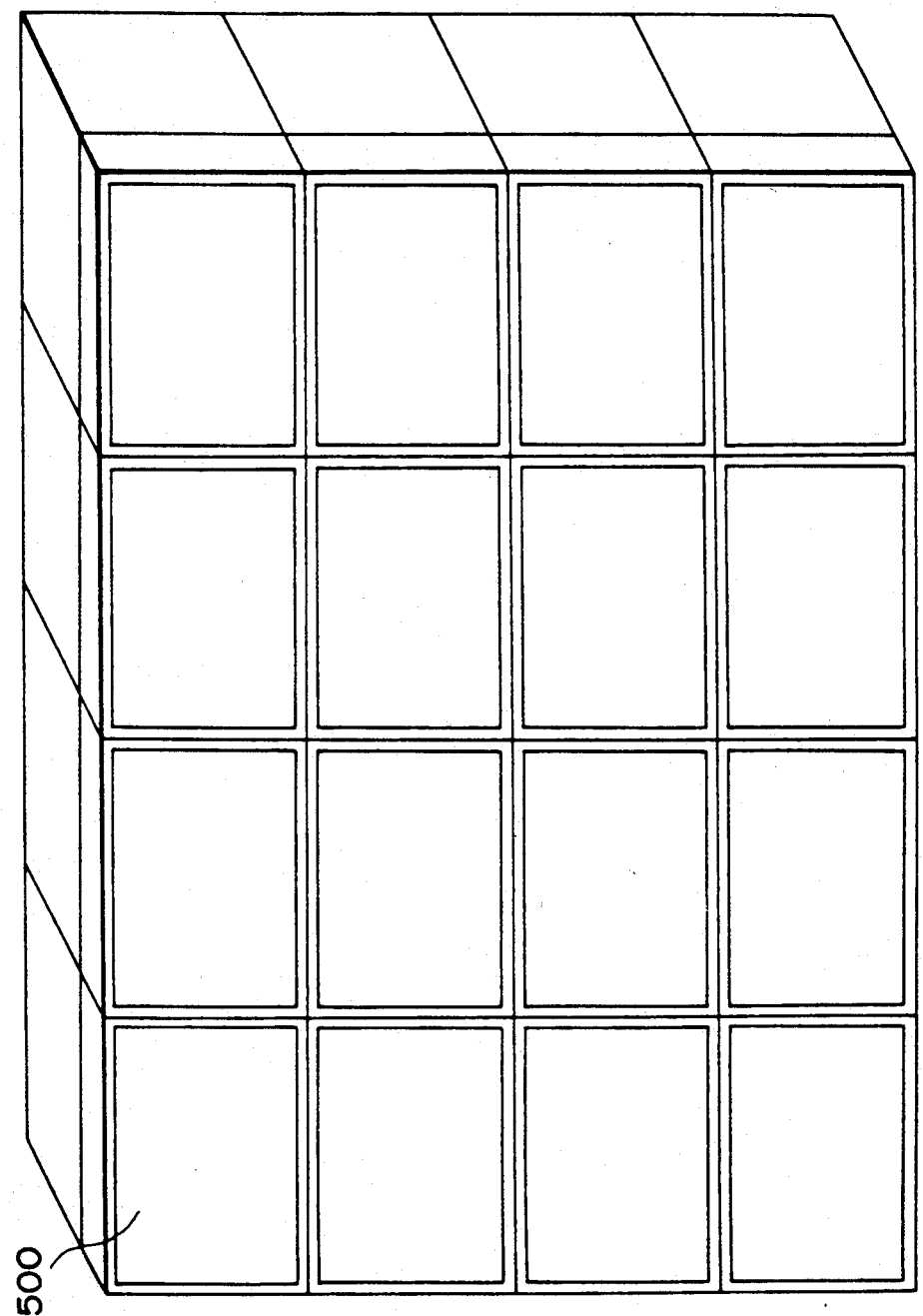
FIG. 7 is a perspective view showing the arrangement of a multi-display having a plurality of conventional projection display devices arrayed.
Figure 8:
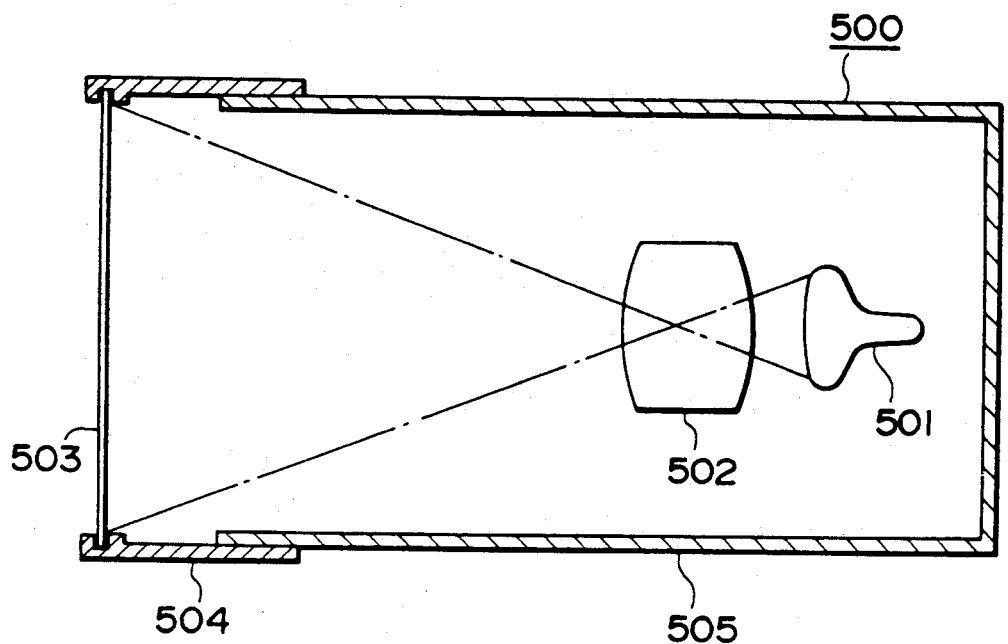
FIG. 8 is a cross sectional plan view of the conventional projection display device shown in FIG. 7.

Still furthermore, as shown in FIG. 6, the projection screen may be constituted by the combination of the diffusing surface 601 and a distributed-refraction plate 605 attached together. Namely, the distributed-refraction plate 605 is such a plate wherein the refractive index is least at the center and increases progressively in proportion to the square of a distance (x) from the center to the corners. Further, the plate may be manufactured by the employment of the diffusion polymerization method of plastic having different refractive indices.

As mentioned above, according to this invention, it is possible to produce the large-size screen display apparatus capable of producing a high quality picture because of the elimination of the non-display areas from the displays arranged in the matrix.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A large screen display apparatus having a plurality of projection display devices arranged in a matrix array, each of the plurality of projection display devices comprising:
   an optical image forming section for creating an optical image in response to a video signal;
   a projection lens for magnifying and projecting an enlarged optical image of the optical image formed by the optical image forming section;
   a housing for accommodating and supporting the optical image forming section and the projection lens; and
   a screen for displaying the enlarged optical image by reflecting incident projected light rays with a transparent plate, the screen including the transparent plate provided on a light entrance side of the screen, receiving the optical image from the projection lens, and a diffusing surface provided on a viewing side of the screen, receiving the optical image from the transparent plate, wherein a periphery of the screen is mounted to the housing and the transparent plate reflects incident light rays from said projection lens so as to increase an angle of magnification of the optical image so that the enlarge optical image is displayed on an entire surface of the diffusing surface, thereby preventing non-display areas on the diffusing surface.

2. The projection display device of claim 1, wherein the transparent plate is fabricated in the form of a lens which is concave at its light entrance side.

3. The projection display device of claim 1, wherein the transparent plate is fabricated in the form of a Fresnel lens.

4. The projection display device of claim 1, wherein the transparent plate is a distributed-reflection plate, a feature of which is that a refractive index increases progressively in proportion to a distance from a center of the transparent plate to corners of the transparent plate.

* * * * *